(12) United States Patent
Fernandes et al.

(10) Patent No.: US 10,293,559 B2
(45) Date of Patent: May 21, 2019

(54) METHOD AND APPARATUS FOR FORMING A COMPOSITE LAMINATE STACK USING A BREATHABLE POLYETHYLENE VACUUM FILM

(71) Applicant: Bombardier Inc., Dorval (CA)

(72) Inventors: Louis Fernandes, Laval (CA); Thomas Riguidel, Montreal (CA)

(73) Assignee: BOMBARDIER INC., Dorval (CA)

( * ) Notice: Subject to any disclaimer, the term of this patent is extended or adjusted under 35 U.S.C. 154(b) by 190 days.

(21) Appl. No.: 15/122,259

(22) PCT Filed: Feb. 26, 2015

(86) PCT No.: PCT/IB2015/051436
§ 371 (c)(1),
(2) Date: Aug. 29, 2016

(87) PCT Pub. No.: WO2015/132700
PCT Pub. Date: Sep. 11, 2015

(65) Prior Publication Data
US 2016/0368229 A1    Dec. 22, 2016

Related U.S. Application Data

(60) Provisional application No. 61/947,716, filed on Mar. 4, 2014.

(51) Int. Cl.
*B29C 70/44*   (2006.01)
*B29C 70/54*   (2006.01)
(Continued)

(52) U.S. Cl.
CPC ........ *B29C 70/446* (2013.01); *B29C 35/0805* (2013.01); *B29C 43/3642* (2013.01);
(Continued)

(58) Field of Classification Search
CPC .................................................... B29C 70/449
See application file for complete search history.

(56) References Cited

U.S. PATENT DOCUMENTS 3,989,781 A * 11/1976 Chant ................. B29C 44/5618
264/46.4
4,201,823 A *  5/1980 Russell ................ B29C 70/025
264/101
(Continued)

FOREIGN PATENT DOCUMENTS

CN    102990944 A    3/2013
CN    103252897 A    8/2013
(Continued)

OTHER PUBLICATIONS

PCT international Search Report and Written Opinion dated May 29, 2015 re: International Application No. PCT/IB2015/051436.
(Continued)

*Primary Examiner* — Robert A Vetere
(74) *Attorney, Agent, or Firm* — Norton Rose Fulbright Canada LLP

(57) ABSTRACT

A method for forming a shaped composite structure. The method includes laying a composite laminate stack (12) onto a mold (18), where the composite laminate stack (12) comprises fabric laminate (14,16) and resin and wherein the mold (18) presents a predetermined shape, draping a vacuum film (22) comprising polyethylene onto the composite laminate stack (12), thereby establishing an evacuatable volume between the vacuum film (22) and the mold (18), applying suction to the evacuatable volume between the mold (18) and the vacuum film (22) to establish at least a partial vacuum within the evacuatable volume, thereby compressing the composite laminate stack (12) via pressure applied to the vacuum film (22) responsive to the at least partial vacuum within the evacuatable volume, and heating (Continued)

the composite laminate stack (12) while applying suction to the evacuatable volume, thereby at least partially consolidating the laminate stack (12).

10 Claims, 3 Drawing Sheets

(51) Int. Cl.
 *B29D 99/00* (2010.01)
 *B29C 35/08* (2006.01)
 *B29C 43/36* (2006.01)
 *B29L 31/30* (2006.01)
 *B29K 307/04* (2006.01)

(52) U.S. Cl.
 CPC ........ *B29C 70/548* (2013.01); *B29D 99/0003* (2013.01); *B29C 2035/0822* (2013.01); *B29C 2043/3644* (2013.01); *B29K 2307/04* (2013.01); *B29K 2313/00* (2013.01); *B29K 2823/06* (2013.01); *B29K 2995/0027* (2013.01); *B29K 2995/0077* (2013.01); *B29K 2995/0081* (2013.01); *B29L 2031/3076* (2013.01)

(56) References Cited

U.S. PATENT DOCUMENTS

| | | | |
|---|---|---|---|
| 5,304,339 | A | 4/1994 | Le Comte |
| 5,439,635 | A * | 8/1995 | Seemann ............ B29C 33/0066 264/154 |
| 6,773,655 | B1 | 8/2004 | Tunis, III et al. |
| 8,262,969 | B2 | 9/2012 | Wade et al. |
| 8,500,085 | B2 | 8/2013 | Jacob et al. |
| 2004/0050498 | A1 | 3/2004 | Herrmann et al. |
| 2008/0099597 | A1 | 5/2008 | Pham et al. |
| 2008/0110563 | A1 | 5/2008 | Engwall et al. |
| 2008/0290214 | A1 | 11/2008 | Guzman et al. |
| 2009/0320292 | A1 | 12/2009 | Brennan et al. |
| 2010/0044912 | A1 | 2/2010 | Zahlen et al. |
| 2010/0230538 | A1 | 9/2010 | Diaz-Caneja Fernandez |
| 2011/0076461 | A1 | 3/2011 | Jacob et al. |
| 2011/0088833 | A1 | 4/2011 | Guzman et al. |
| 2011/0095132 | A1 | 4/2011 | Manfredotti et al. |
| 2011/0209812 | A1 | 9/2011 | Bansal et al. |
| 2012/0025023 | A1 | 2/2012 | Bernard et al. |
| 2012/0097323 | A1 * | 4/2012 | Nitsch .................... B29C 33/76 156/212 |
| 2012/0100343 | A1 | 4/2012 | Borghini-Liiii et al. |
| 2012/0261057 | A1 | 10/2012 | Bergmann et al. |
| 2012/0273809 | A1 | 11/2012 | Tsai et al. |
| 2013/0316147 | A1 | 11/2013 | Douglas et al. |
| 2013/0340944 | A1 | 12/2013 | Modin |

FOREIGN PATENT DOCUMENTS

| | | |
|---|---|---|
| RU | 2261374 | 9/2005 |
| WO | 2006112823 A1 | 10/2006 |
| WO | 2011101513 A1 | 8/2011 |
| WO | 2013153537 A2 | 10/2013 |

OTHER PUBLICATIONS

English translation of Russian patent document No. RU 2 261 374 published on Sep. 27, 2005; ProQuest Dialog; accessed on Sep. 9, 2016.
English Abstract and Figures re: Russian patent document No. RU 2 261 374 published on Sep. 27, 2005; obtained from www37.orbit. com . . . ; accessed Sep. 13, 2015.
English translation of patent document No. WO 2011/101513 dated Aug. 25, 2011; accessed on Aug. 26, 2016.
The State Intellectual Property Office of the People's Republic of China; Office Action dated May 19, 2017 re: application No. 201580011671.0.
English translation of China patent document No. CN102990944 dated Mar. 27, 2013; https://www.google.ca/patents/CN102990944A? dq=CN102990944A&cl=en; accessed Jun. 23, 2017.
English translation of China patent document No. CN103252897 dated Aug. 21, 2013; https://www.google.ca/patents/CN103252897A? dq=CN103252897a&cl=en; accessed on Jun. 23, 2017.

* cited by examiner

METHOD AND APPARATUS FOR FORMING A COMPOSITE LAMINATE STACK USING A BREATHABLE POLYETHYLENE VACUUM FILM

CROSS-REFERENCE TO RELATED APPLICATION(S)

This application is a national phase application under 35 U.S.C. 371 of International Patent Application No. PCT/IB2015/051436 filed on Feb. 26, 2015, which claims priority from U.S. Provisional Patent Application Ser. No. 61/947,716, filed on Mar. 4, 2014, the entire content of which is incorporated herein by reference.

FIELD OF THE INVENTION

The present invention concerns a method and apparatus for forming a composite laminate stack using a breathable polyethylene vacuum film.

DESCRIPTION OF THE RELATED ART

In the construction of a composite material, it is known to stack layers of composite laminate material onto a mold. The composite laminate layers also are stacked on top of one another and compressed using a vacuum that is applied using a vacuum film (sometimes also referred to as a "vacuum bag"). So that air may be removed from the space between the vacuum film and the mold, a breather material is interposed between the composite laminate layers and the vacuum film. While the vacuum is applied, the composite laminate layers are heated simultaneously. The application of heat and pressure (via the vacuum and/or positive pressure) consolidates the composite laminate layers into a composite laminate structure.

Conventionally, the vacuum film is made from a silicone or a nylon based material, which is flexible and establishes a suitable seal to establish a partial vacuum within the space between the vacuum film and the mold.

One difficulty with silicone is that silicone used for hot forming applications tends to stretch and deform, causing variations in the laminate thickness due to a non-uniform pressure distribution, especially when vacuum and/or heat is applied. While this may not be problematic in every instance where a composite laminate structure is being created, the problem becomes exaggerated when the composite laminate materials are placed onto a mold for the formation of stringers that have more complex shapes, such as Δ-shaped stringers or Ω-shaped stringers.

For reference, a stringer is a structural strengthening element that is attached to another element, such as a fairing, to reinforce the other element and increase the strength and rigidity of that other element. While stringers may have any of a number of shapes, stringers may be constructed with a Δ-shape or Ω-shape, which are considered to be complex shapes for composite stringers To date, the prior art has not provided a suitable substitute for the silicone vacuum film.

SUMMARY OF THE INVENTION

The present invention addresses one or more of the deficiencies noted with respect to the prior art. In particular, the present invention provides for a method for forming a shaped composite structure. The method includes laying a composite laminate stack onto a mold, where the composite laminate stack comprises fabric laminate and resin and wherein the mold presents a predetermined shape, draping a vacuum film comprising polyethylene onto the composite laminate stack, thereby establishing an evacuatable volume between the vacuum film and the mold, applying suction to the evacuatable volume between the mold and the vacuum film to establish at least a partial vacuum within the evacuatable volume, thereby compressing the composite laminate stack via pressure applied to the vacuum film responsive to the at least partial vacuum within the evacuatable volume, and heating the composite laminate stack while applying suction to the evacuatable volume, thereby at least partially consolidating the laminate stack.

In one contemplated embodiment, the resin is pre-impregnated into at least a portion of the composite laminate stack.

In another contemplated embodiment, the heating step include the application of infrared electromagnetic radiation at least through the vacuum film within a wavelength range between at least one of about 700 nm-1 mm, 2-10 μm, or 1.5-8 μm.

Still further, the heating step is contemplated to occur at a temperature of at least one of between about 110-130° F. (43.33-54.55° C.), between about 115-125° F. (46.11-51.67° C.), or about 120° F. (48.89° C.).

Concerning the mold, the predetermined shape may include at least one of an Ω-shaped or a Δ-shaped surface.

It is contemplated that the fabric laminate may include carbon fibers, among other types of fibers.

In addition, one side of the vacuum is contemplated to include a pattern of channels, permitting gases to be evacuated when the suction is applied to the evacuatable volume. The pattern may be a rectilinear grid pattern of the channels or a diamond pattern of the channels, among other patterns.

The present invention also provides for a vacuum film suitable for use in compacting a composite laminate stack of at least two fiber layers against a mold. The vacuum film includes polyethylene having a first surface and a second, opposing surface, and a surface pattern, disposed on at least one of the first surface and the second surface. The surface pattern includes a network of channels suitable for evacuating gasses from between the vacuum film and the mold.

In one contemplated embodiment, the vacuum film has a thickness of between about 9.5 mils (0.24 mm)±10%, is transparent to infrared electromagnetic radiation with a wavelength within a range of about 700 nm-1 mm, has a tensile elongation in a machine direction of between about 500-550%, has a tensile elongation in a transverse direction of between about 650-700%, has a tensile strength in the machine direction of between about 3300-3500 psi, has a tensile strength in the transverse direction of between about 2700-2900 psi, has an Elemendorf tear strength in the machine direction of between about 0.6-0.8 lb/mil, and has an Elemendorf tear strength in the transverse direction of between about 0.9-1.1 lb/mil. In addition, the channels are contemplated to have a width of between about 11.2 mils (0.28 mm) 10%, a depth of between about 6 mils (0.15 mm)±10%, and are disposed apart from one another by a separation distance of between about 84.8 mils (2.15 mm)±10%.

It is contemplated that the surface pattern may have a rectilinear grid pattern of the channels or a diamond pattern of the channels.

In addition, it is contemplated that the vacuum film may have a tensile elongation in the machine direction of about 525% and a tensile elongation in the transverse direction of about 675%.

Furthermore, it is contemplated that the vacuum film may have a tensile strength in the machine direction of about 3400 psi and a tensile strength in the transverse direction of about 2800 psi.

Next, the vacuum film may have an Elemendorf tear strength in the machine direction of about 0.7 lb/mil and an Elemendorf tear strength in the transverse direction of about 1.0 lb/mil.

Also, the vacuum film is contemplated to resist deformation in a temperature range of at least one of between about 110-130° F. (43.33-54.55° C.), between about 115-125° F. (46.11-51.67° C.), or about 120° F. (48.89° C.).

The present invention also provides for a method for forming a shaped composite structure. The method is contemplated to include laying a composite laminate stack onto a mold, where the composite laminate stack comprises fabric laminate and resin and wherein the mold presents a predetermined shape, draping a vacuum film onto the composite laminate stack, thereby establishing an evacuatable volume between the vacuum film and the mold, the vacuum film, applying suction to the evacuatable volume between the mold and the vacuum film to establish at least a partial vacuum within the evacuatable volume, thereby compressing the composite laminate stack against the mold, and heating the composite laminate stack while applying suction to the evacuatable volume, thereby at least partially consolidating the laminate stack. The vacuum film is contemplated to resist deformation when exposed to infrared electromagnetic radiation having a wavelength within a range of about 700 nm-1 mm and a temperature range of between about 110-130° F. (43.33-54.55° C.).

The vacuum film may be made from, among other materials, polyethylene.

One side of the vacuum film comprises may include a pattern of channels, permitting gases to be evacuated when the suction is applied to the evacuatable volume.

The pattern may be a rectilinear grid pattern of the channels or a diamond pattern of the channels, among other possible patterns.

Still other aspects of the present invention will be made apparent from the discussion that follows.

BRIEF DESCRIPTION OF THE DRAWINGS

The present invention will now be described in connection with the drawings appended hereto, in which.

DETAILED DESCRIPTION OF EMBODIMENT(S) OF THE INVENTION

The present invention will now be described in connection with one or more embodiments. The discussion of any one particular embodiment or associated feature is not intended to be limiting of the present invention. To the contrary, the discussion of particular embodiments and features is intended to illustrate the breadth and scope of the present invention. There are numerous variations and equivalents that will be made apparent from the discussion that follows. Those variations and equivalents are intended to be encompassed by the scope of the present invention as if described herein.

With respect to various features that are discussed in connection with specific embodiments, it is noted that the features are not intended to be exclusive of one another. To the contrary, as should be apparent to those skilled in the art, several of the features may be combinable in arrangements that differ from the specific embodiments described below. Those combinations are contemplated to fall within the scope of the present invention.

Figure 1:
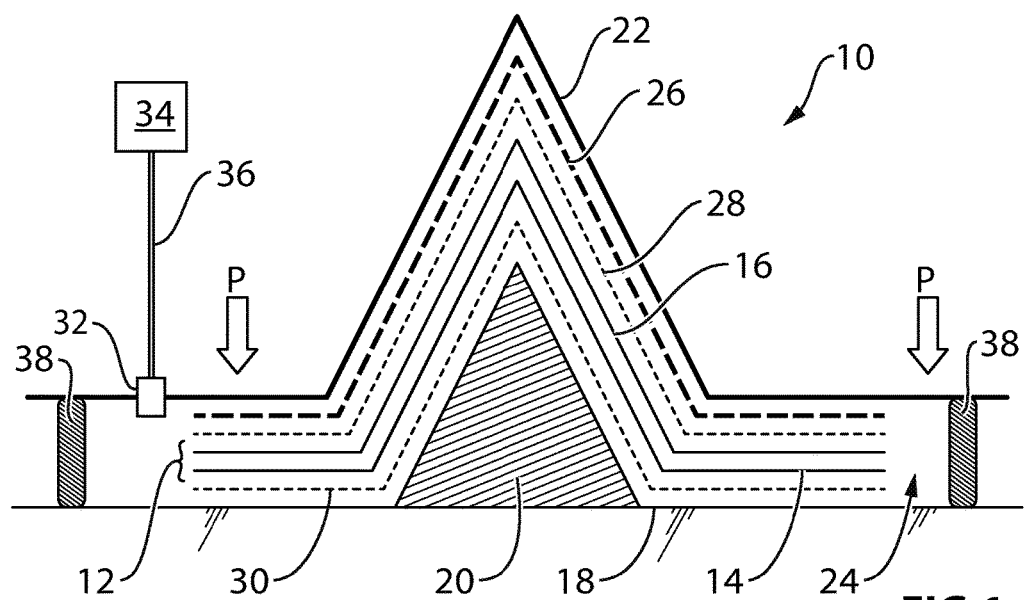
FIG. 1 is a graphical representation of a cross-section of an arrangement of components for the creation of a consolidated, composite laminate stack according to the prior art.

FIG. 1 is a graphical side view of a cross-section of one example in the prior art for a consolidation apparatus 10, which is defined herein as an arrangement of components for the creation of a consolidated, composite laminate stack.

A consolidated, composite laminate stack may have many applications and be suitable for any of a number of installations. Among them, the consolidated, composite laminate stack may be used for the creation of a component for an aircraft. The aircraft component may be a stringer, fuselage panel, engine fairing, or any other component.

Figure 2:
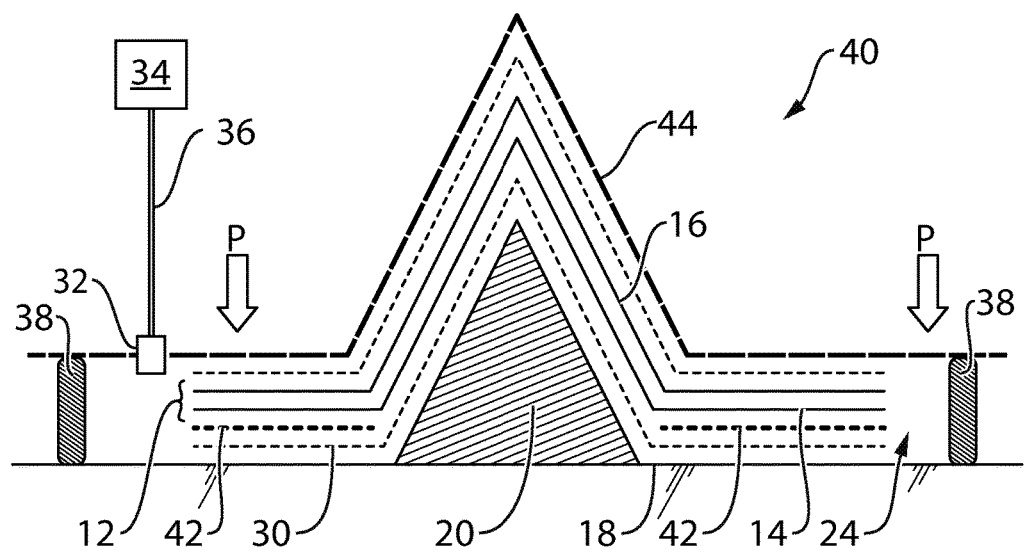
FIG. 2 is a graphical representation of a cross-section of an arrangement of components for the creation of a consolidated, composite laminate stack according to the present invention.

Typically, a composite laminate stack 12 is made from at least two layers of fiber laminate 14, 16, which could be carbon fiber laminate layers, for example. Although two layers of carbon fiber laminate 14, 16 are shown in FIGS. 1 and 2 for the sake of simplicity, it should be understood that many more layers of carbon fiber laminate 14, 16 may be employed without departing from the scope of the present invention. In the manufacture of a stringer for an aircraft, it is not uncommon for the composite laminate stack 12 to include between about nine to twenty layers of carbon laminate, for example. The layers of carbon fiber laminate 14, 16 may include prepreg laminate layers.

As shown in FIG. 1, the layers of carbon fiber laminate 14, 16 are stacked on top of a mold 18. In the illustrated example, the mold includes a Δ-shaped feature 20. The mold 18 establishes the shape for the consolidated, composite laminate stack 12 produced by the consolidation apparatus 10.

So that the layers of carbon fiber laminate 14, 16 may be consolidated, the layers of carbon fiber laminate 14, 16 are compacted by application of pressure P resulting from the application of a vacuum (or partial vacuum) between a vacuum film 22 and the mold 18. The space between the vacuum film 22 and the mold 18 also is referred to as an evacuatable volume 24. In this prior art version of the consolidation apparatus 10, the vacuum film 22 is made from a silicone or nylon based material.

A breather material 26 and a first release layer 28 are inserted between the composite laminate stack 12 and the vacuum film 22. The breather material 26 is typically made from a cloth material or laminate. The breather material 26 establishes an air volume between the vacuum film 22 and the composite laminate stack 12 to facilitate the removal of air from the evacuatable volume 24.

So that the silicone vacuum film 22 and the breather material 24 easily separate from the composite laminate stack 12, a first release layer 28 typically is inserted between the breather material 24 and the composite laminate stack 12. Similarly, to facilitate separation of the composite laminate stack 12 from the mold 18, a second release layer 30 typically is inserted between the composite laminate stack 12 and the mold 18.

To apply a vacuum or partial vacuum in the evacuatable volume 24 between the vacuum film 22 and the mold 18, the vacuum film 22 is provided with a connector 32 that connects to a vacuum source 34 via a vacuum line 36. A seal 38 may be provided around the periphery of the vacuum film 22 to assure an airtight seal around the mold 18.

During consolidation of the composite laminate stack 12, a vacuum is applied in the evacuatable volume 24 between the vacuum film 22 and the mold 18. At the same time, the composite laminate stack 12 is heated. Heat may be applied from an area within the mold 18 and/or from a source external to the mold 18. For example, heat may be applied via heating elements within the mold 18. In addition, heat may be applied via heat lamps positioned near to the mold 18 (e.g., above the mold 18), external to the vacuum film 22. Heat may be applied in other ways, as should be apparent to those skilled in the art.

A deficiency with existing silicone vacuum films is that when they are used to form Δ-shaped stringers 18, such as the one shown (or Ω-shaped stringers), and heat is applied, the silicone tends to stretch and deform in areas where the shape makes significant transitions, such as at the apex of the Δ or adjacent to the bottom ends of the Ω where the ends transition to the horizontally-oriented features. Deformation of the silicone vacuum film may result in an inadequately formed stringer (or other component), which may result ultimately in the rejection of the component for service.

Figure 3:
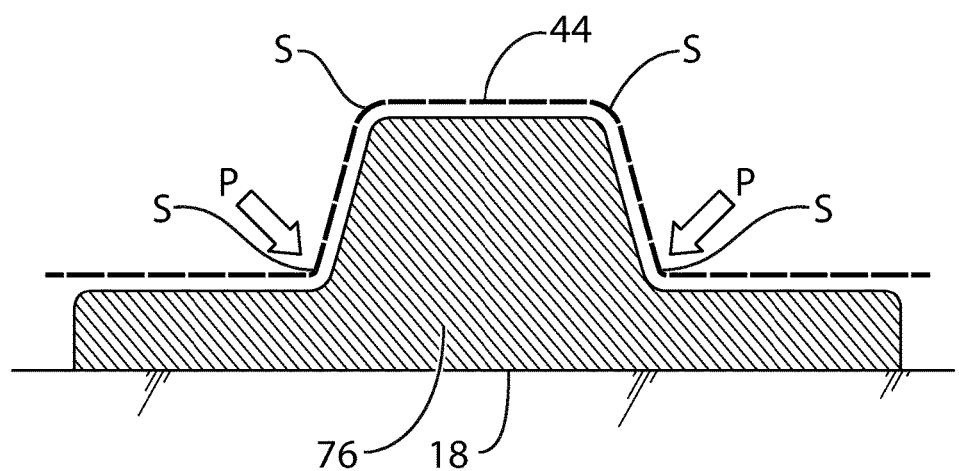
FIG. 3 is a graphical, cross-sectional side view of various stress points applicable to a vacuum film placed upon an Ω-shaped feature on a mold for forming a consolidated, composite laminate stack.

FIG. 3 is a graphical, cross-sectional side view of various stress points S associated with a vacuum film 44 placed upon an Ω-shaped feature 76 that is part of a mold 18 for forming a consolidated, composite laminate stack 12 (omitted in this view). The stress points S are associated with transition regions, as noted above. In the case where the vacuum film 44 is a silicone vacuum film, the silicone material tends to stretch and deform at the stress points S, also as noted. This may result in an improperly formed composite laminate stack 12.

In accordance with a non-limiting example of the present invention, the composite laminate stack 12 typically is pre-impregnated with resin (also referred to as a prepreg material). During the application of both heat and pressure, the resin impregnates the material fibers and migrates such that adjacent composite layers 14, 16 in the composite laminate stack 12 become adhered to one another. This process is referred to as consolidation or coalescing herein. After the heat and pressure are discontinued and the composite laminate stack 12 cools, the consolidated composite laminate stack 12 retains the shape of the mold 18.

Reference is now made to FIG. 2, which describes the present invention with reference to the conventional example, as illustrated and discussed in connection with FIG. 1.

By way of introduction, and by comparison with the consolidation apparatus illustrated in FIG. 1, it is noted that, for the consolidation apparatus 40 of the present invention, release strips 42 have been added. In addition, the vacuum film 22 has been replaced by an auto-breather vacuum film 44 (also referred to herein as a breathable film 44). In addition, the breather material 26 has been eliminated.

In the consolidation apparatus 40 of the present invention, to create a consolidated composite laminate stack 12 in a predetermined shape, it is contemplated that the composite laminate stack 12 will be placed on top of the mold 18 including, for example, the Δ-shaped portion 20. While it is contemplated that individual laminate layers 14, 16 may be stacked on top of one another on the mold 18, it is anticipated that the composite laminate stack 12 will be formed prior to placement onto the mold 18 and subsequently laid onto the mold 18 as a unit.

With respect to the composite laminate layers 14, 16, it is noted that these layers 14, 16 are merely representative of a plurality of composite laminate layers 14, 16 that may be stacked and debulked (on a flat or a non-flat surface) before being stacked on top of one another to form the composite laminate stack 12. As indicated above, it is contemplated that the composite laminate stack 12 will include more than just two single composite laminate layers 14, 16. In fact, it is contemplated that approximately twelve composite laminate layers 14, 16 or more may be stacked on top of one another to form the consolidated, composite laminate stack 12.

In the context of the present invention, it is contemplated that the composite laminate layers 14, 16 will be made from unidirectional carbon fiber laminates pre-impregnated with resin. However, it is noted that the composite laminate layers 14, 16 may be made from non-woven laminates. Separately, the composite laminate layers 14, 16 may be made from materials other than carbon fiber. For example, aramid fibers and para-aramid fibers (including Kevlar™ (a trademark of E.I DuPont de Nemours and Company)) and other suitable materials may be employed without departing from the scope of the present invention. Still further, the composite laminate layers 14, 16 may be made from a combination of carbon fibers, aramid fibers, para-aramid fibers, and other materials, as should be apparent to those skilled in the art.

The resin may be any material that may be considered to be suitable by those skilled in the art. Resins include, but are not limited to, epoxy resins, polyester resins, vinylester resins, and the like.

It is contemplated that the composite laminate layers 14, 16 may not include a resin. Instead, the composite laminate layers 14, 16 may be treated in a fashion that facilitates consolidation without the use of resin. In other words, the present invention should not be considered to be limited to embodiments where each of the composite laminate layers 14, 16 are pre-impregnated with resin.

Variations also are contemplated to fall within the scope of the present invention. For example, every other one of the composite laminate layers 14, 16 may be pre-impregnated with resin. Separately, the composite laminate layers 14, 16 may be free of resin, which may be introduced before the application of heat and pressure. Still further, the composite laminate layers 14, 16 may be pre-impregnated with resin on selected areas, zones, or regions thereof.

In the consolidation apparatus 40 of the present invention, the auto-breather vacuum film 44 comprises polyethylene. As will be made apparent from the discussion that follows, other materials also may be employed without departing from the scope of the present invention.

A vacuum bag comprising polyethylene (and in some cases primarily polyethylene) has improved release characteristics by comparison with silicone. For example, polyethylene is able to resist deformation and/or elongation when exposed to a vacuum and to heat, thereby allowing good compaction of the composite laminate stack 12 against the tight curves of the mold 18.

Figure 4:
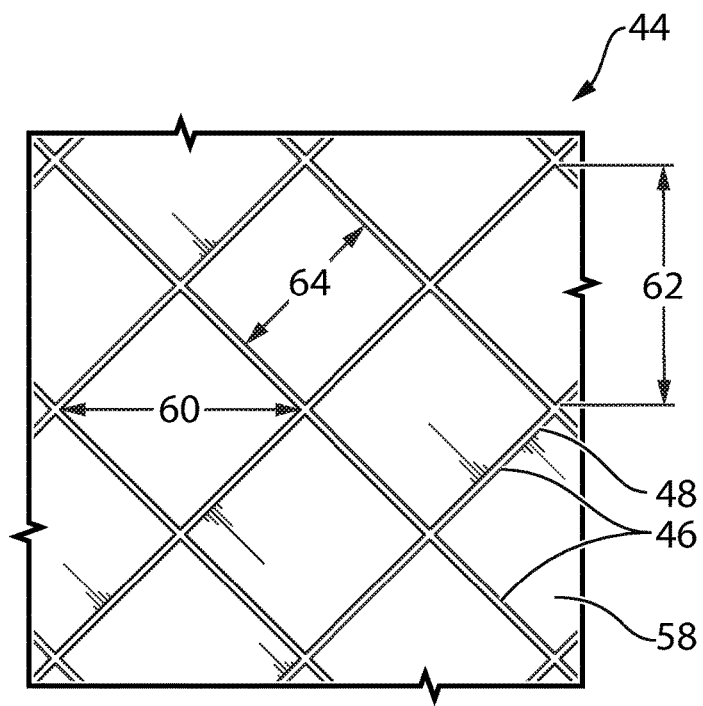
FIG. 4 is a graphical representation of a top view of a portion of a breathable vacuum film according to the present invention.

With reference to FIG. 4, the auto-breather vacuum film 44 is contemplated to be provided with a grooved pattern 46 on at least one surface thereof. The grooved pattern 46 is provided to establish air channels between the auto-breather vacuum film 44 and the composite laminate stack 12 (that is, within the evacuatable space 24) that allows for the removal of air from the evacuatable space 24. The grooved pattern 46 may include any repeating or non-repeating pattern of grooves 48 as required or as desired. Moreover, the grooved pattern 46 may change at different places on the auto-breather vacuum film 44. In other words, a uniform grooved pattern 46 need not be applied across the entire surface of the auto-breather vacuum film 44. The auto-breather vacuum film 44 is presented as a non-limiting, first embodiment of the auto-breather vacuum film 44 according to the present invention.

Figure 5:
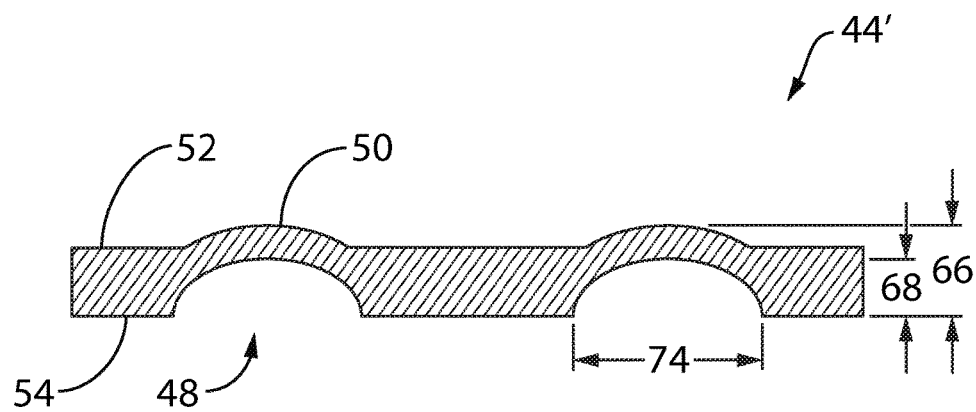
FIG. 5 is a graphical, cross-sectional side view of a first contemplated construction of the breathable vacuum film illustrated in FIG. 4.

With reference to FIG. 5, a non-limiting, second embodiment of the auto-breather vacuum film according to the present invention is illustrated and is labeled 44'. In this embodiment, the vacuum film 44' includes a plurality of embossments 50, each of which form the individual grooves 48 in the vacuum film 44'. Since the grooves 48 are formed through embossments 50, the top surface 52 and the bottom surface 54 include the embossments 50. On the top surface 52, the embossments 50 are convex and on the bottom surface 54, the embossments 50 are concave, thereby establishing the grooves 48 in the vacuum film 44'.

Figure 6:
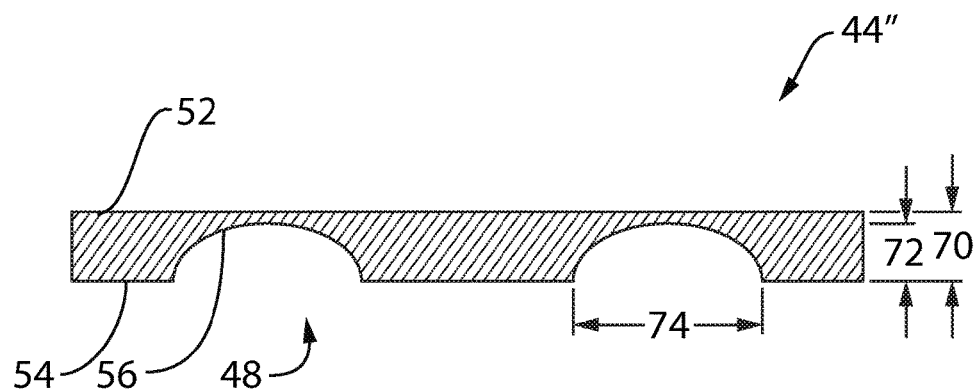
FIG. 6 is a graphical, cross-sectional side view of a second contemplated construction of the breathable vacuum film illustrated in FIG. 4.

With reference to FIG. 6, a non-limiting, third embodiment of an auto-breather vacuum film is shown and is labeled 44". Here, the grooves 48 are formed by individual channels 56 that are cut, molded, or otherwise formed in the bottom surface 54 of the auto-breather vacuum film 44".

As should be apparent from the foregoing, the grooves 48 may be established in the auto-breather vacuum film 44, 44', 44" via any suitable manufacturing technique without departing from the scope of the present invention. It is contemplated, however, that the grooves 48 will be formed on at least the bottom surface 54 of the vacuum film 44, 44', 44" to establish air channels immediately adjacent to the composite laminate stack 12 in the consolidation apparatus 40.

With renewed reference to FIG. 2, it is noted that release strips 42 are applied to regions of the composite laminate stack 12 to facilitate slippage of the composite laminate stack 12 during application of the vacuum to the evacuatable volume 24.

As noted above, the auto-breather vacuum film 44, 44', 44" is contemplated to be made from a polyethylene material, which possesses suitable release characteristics. As a result, a first release layer 28 may not be required for the consolidation apparatus 40 of the present invention. It is contemplated that a second release layer 30 will be provided between the composite laminate stack 12 and the mold 18. Moreover, as noted above, in selected locations, release strips 42 are contemplated to be added to facilitate slippage of the composite laminate stack 12 with respect to the mold 18 during consolidation.

With renewed reference to FIG. 4, the grooves 48 are shown in a diamond-shaped pattern 46. While this pattern 46 is considered to be suitable for the auto-breather vacuum film 44, 44', 44" the grooves 48 may follow any other suitable pattern without departing from the scope of the present invention. For example, the grooves 48 may be set out in a rectilinear pattern, like a piece of graph paper. Other patterns also may be employed, including curved grooves 48, without departing from the scope of the present invention.

With respect to the diamond shaped pattern 46 applied to the vacuum film 44, 44', 44" it is contemplated that individual diamonds 58 will have a width 60 and a height 62 and be separated from one another by a separation distance 64. The width 60 is contemplated to be about 74.4 mils (74.4 thousandths of an inch) (1.89 mm)±10%. The height 62 is contemplated to be about 129.7 mils (3.29 mm)±10%. The separation distance 64 is contemplated to be about 84.8 mils (2.15 mm)±10%. Alternatively, the width 60 may be about 74.4 mils (1.89 mm) 5%, the height 62 may be about 129.7 mils (3.29 mm)±5%, and the separation distance 64 may be about 84.8 mils (2.15 mm)±5%. In a further alternative, the width 60 may be about 74.4 mils (1.89 mm)±2%, the height 62 may be about 129.7 mils (3.29 mm)±2%, and the separation distance 64 may be about 84.8 mils (2.15 mm)±2%. As apparent, in the illustrated embodiment, the width 60 may be about 74.4 mils (1.89 mm), the height 62 may be about 129.7 mils (3.29 mm), and the separation distance 64 may be about 84.8 mils (2.15 mm)±2%.

With reference to FIG. 5, the auto-breather vacuum film 44' may have a thickness 66 of about 9.5 mils (0.24 mm) with a groove depth 68 of about 6 mils (0.15 mm)±10%. Alternatively, the auto-breather vacuum film 44' may have a thickness 66 of about 9.5 mils (0.24 mm) with a groove depth 68 of about 6 mils (0.15 mm)±5%. In a further embodiment, the auto-breather vacuum film 44' may have a thickness 66 of about 9.5 mils (0.24 mm) with a groove depth 68 of about 6 mils (0.15 mm)±2%. As may be apparent, in the illustrated embodiment, the thickness 66 of the auto-breather vacuum film 44' is about 9.5 mils (0.24 mm) and the groove depth 68 is about 6 mils (0.15 mm).

With reference to FIG. 6, the auto-breather vacuum film 44" may have a thickness 70 of about 9.5 mils (0.24 mm) with a groove depth 72 of about 6 mils (0.15 mm)±10%. Alternatively, the auto-breather vacuum film 44" may have a thickness 70 of about 9.5 mils (0.24 mm) with a groove depth 72 of about 6 mils (0.15 mm)±5%. In a further embodiment, the auto-breather vacuum film 44" may have a thickness 70 of about 9.5 mils (0.24 mm) with a groove depth 72 of about 6 mils (0.15 mm)±2%. As should be apparent, in the illustrated embodiment, the thickness 70 of the auto-breather vacuum film 44" is about 9.5 mils (0.24 mm) with a groove depth 72 of about 6.5 mils (0.15 mm).

As noted above, the grooves 48 in the auto-breather vacuum film 44, 44', 44" establish air channels within in the evacuatable space 24 that allow for the removal of air from the evacuatable space 24. In particular, it is contemplated that the grooves 48 will be of a sufficient size, density, and spacing, to assure an acceptable rate of air removal from the evacuatable space 24 and, thereby, to assure the formation of a consolidated laminate stack 12 with desirable consolidation characteristics. In this manner, the auto-breather vacuum film 44, 44', 44" combines the functionality of the vacuum film 22 and breather material 26 shown in FIG. 1.

In connection with the thickness 70 of the auto-breather vacuum film 44", it is noted that the thickness 70 may fall within a much larger range of about 5-12 mils (0.13 mm-0.30 mm). A smaller thickness 70 is unlikely to provide a suitable amount of the auto-breather film material for the formation of adequate grooves 48. A thickness 70 greater than 12 mils (0.30 mm) may become too rigid to be useful as the auto-breather vacuum film 44".

With respect to each embodiment of the auto-breather vacuum film 44, 44', 44", it is contemplated that the grooves 48 may have a width of about 11.2 mils (0.28 mm)±10%. Alternatively, the width 74 of the grooves 48 may be about 11.2 mils (0.28 mm)±5%. In a further embodiment, the width 74 may be about 11.2 mils (0.28 mm)±2%. As may be apparent, in the illustrated embodiment, the width 74 of the grooves 48 is about 11.2 mils (0.28 mm).

As indicated above, the composition of the auto-breather vacuum film 44, 44', 44" comprises polyethylene. Additives may be included in the polyethylene without departing from the scope of the present invention. For example, the polyethylene may include titanium dioxide (<5.0%), lead (<1.0%), and chromium (<0.1%), among other additive materials. One suitable material for the vacuum bag is a material called "Embossed Polyethylene Film" (product code DC500A) sold by Bloomer Plastics, Incorporated, with a business address at 1710 North Industrial Drive, Bloomer, Wis. 54724-0005 (as reported in the Material Safety Data Sheet dated Aug. 11, 2011).

The present invention contemplates that the auto-breather vacuum film 44, 44', 44" will have a sufficient thickness to assist with establishing an adequate vacuum in the evacuatable space 24 between the vacuum film 44, 44', 44" and the mold 18. Moreover, it is contemplated that the auto-breather vacuum film 44, 44', 44", since it is made from polyethylene, will resist deformation when the vacuum is applied.

As noted above, to form the composite laminate stack 12, heat is applied to the composite laminate layers 14, 16 during the time that the vacuum is applied to the evacuatable volume 24 between the auto-breather vacuum film 44, 44', 44" and the mold 18.

Heat may be applied by any type of heater. However, it is contemplated that heat will be applied in the form of radiant heat. To assure that maximal heat is transmitted to the composite laminate layers 14, 16, the vacuum film 44, 44', 44" is contemplated to be transparent to infrared electromagnetic radiation. More specifically, the auto-breather vacuum film 44, 44', 44" is contemplated to be transparent to infrared electromagnetic radiation with a wavelength of 700 nm-1 mm and a frequency of 430 THz-300 GHz. More specifically, if the heat source is a ceramic heating element, the auto-breather vacuum film 44, 44', 44" is contemplated to be transparent to infrared electromagnetic radiation with a wavelength in the range of between about 2-10 µm. If a quartz heat lamp is utilized, it is contemplated that the auto-breather vacuum film 44, 44', 44" will be transparent to infrared electromagnetic radiation with a wavelength in a range between about 1.5-8 µm. As should be apparent, other heat sources may be employed that generate infrared electromagnetic radiation in other wavelength ranges.

While not considered to be limiting of the invention, it is noted that plastics, such as polyvinylchloride and polyethylene, have a peak absorption for infrared electromagnetic radiation of around 3500 nm. Accordingly, it is contemplated that the source of infrared electromagnetic radiation will be selected so as to avoid the generation of heat within the wavelength of around 3500 nm to avoid absorption by the polyethylene.

It is understood that the absorption properties of the material used for the auto-breather vacuum film 44, 44', 44" may vary depending upon the additives incorporated into the polyethylene. Accordingly, it may be necessary to tune the heating source to the properties of the auto-breather vacuum film 44, 44', 44" so that the auto-breather vacuum film 44, 44', 44" exhibits transparency at the primary wavelengths emitted by the heater.

It is also contemplated that the auto-breather vacuum film 44, 44', 44" will be made from a material that is substantially transparent to infrared electromagnetic radiation during the consolidation process. In particular, it is contemplated that the auto-breather vacuum film 44, 44', 44" is transparent to infrared electromagnetic radiation at an elevated temperature of between about 110-130° F. (43.33-54.55° C.), between about 115-125° F. (46.11-51.67° C.), or about 120° F. (48.89° C.). In other words, so that the composite laminate layers 14, 16 forming the composite laminate stack 12 may coalesce (or be consolidated) as a result of heating at one or more of these temperatures, it is contemplated that the polyethylene will be transparent (or substantially transparent) to the infrared electromagnetic radiation at these temperatures. It is noted that the temperature applied during the consolidation process is related to the resin employed. Accordingly, temperatures different from those described herein are contemplated to fall within the scope of the present invention.

In addition, it is contemplated that the auto-breather vacuum film 44, 44', 44" will resist deformation, elongation, and creep at these same temperatures of between about 110-130° F. (43.33-54.55° C.), between about 115-125° F. (46.11-51.67° C.), or about 120° F. (48.89° C.). Being resistant to deformation, elongation, and creep at these operating temperatures, the auto-breather vacuum film 44, 44', 44" will resist changing its shape and, therefore, will assist in compacting the composite laminate stack 12 against the mold until the composite laminate stack 12 is consolidated into the shape that is complimentary to the mold 18.

Concerning the grooves 48, it is contemplated that the grooves 48, regardless of the manner in which they are formed in the auto-breather vacuum film 44, 44', 44" will have a sufficiently robust cross-section and a sufficiently large distribution to facilitate removal of air from the composite fabric stack 12 to facilitate the consolidation (or coalescing) of the layers 14, 16. As may be apparent, if the grooves 48 are too small or there are too few grooves 48, the grooved pattern 46 may not present sufficient channels for removal of air. If so, the auto-breather vacuum film 44, 44', 44" may not be able to apply sufficient pressure P to the composite laminate stack 12 for the composite laminate layers 14, 16 to coalesce (or consolidate) into a unitary body.

Separately, it is contemplated that the auto-breather vacuum film 44, 44', 44" may be employed to consolidate the composite laminate stack 12 at or near room temperature. In particular, the auto-breather vacuum film 44, 44', 44" may be used for a debulking operation prior to consolidation. The debulking operation is essentially the same as described above, except that heat is not applied to activate the resin. Instead, the auto-breather vacuum film 44, 44', 44" may be laid on top of the composite laminate stack 12 so that a vacuum may be applied to the evacuatable volume 24. The debulking operation is employed to compact the composite laminate stack 12 prior to consolidation using heat. It is noted that debulking the composite laminate stack 12 using the auto-breather vacuum film 44, 44', 44" improves debulking by 3-4% or more (by comparison with the prior art using a nylon film and breather material). It is noted that debulking operations may be repeated, as necessary, during the construction of the composite laminate stack 12 from a plurality of individual fabric layers.

As noted above, the present invention has been described in connection with several embodiments and variations. The present invention is not intended to be limited to any one particular embodiment or to any one particular feature described herein. To the contrary, there are numerous variations and equivalents that those skilled in the art would appreciate in connection with the present invention. Those variations and equivalents are intended to be encompassed by the present invention.

What is claimed is:

1. A method for forming a shaped composite structure, comprising:

laying a composite laminate stack onto a mold, wherein the composite laminate stack comprises fabric laminate and resin and wherein the mold presents a predetermined shape;

draping a vacuum film comprising polyethylene onto the composite laminate stack, thereby establishing an evacuatable volume between the vacuum film and the mold;

applying suction to the evacuatable volume between the mold and the vacuum film to establish at least a partial vacuum within the evacuatable volume, thereby compressing the composite laminate stack via pressure applied to the vacuum film responsive to the at least partial vacuum within the evacuatable volume; and heating the composite laminate stack while applying suction to the evacuatable volume, thereby at least partially consolidating the laminate stack, wherein:

one side of the vacuum film comprises a pattern of channels, permitting gases to be evacuated when the suction is applied to the evacuatable volume;

the vacuum film has a thickness of between 9.5 mils (0.24 mm)±10%;

the vacuum film is transparent to infrared electromagnetic radiation with a wavelength within a range of about 700 nm 1 mm;

the vacuum film has a tensile elongation in a machine direction of between about 500-550%;

the vacuum film has a tensile elongation in a transverse direction of between about 650-700%;

the vacuum film has a tensile strength in the machine direction of between about 3300-3500 psi;

the vacuum film has a tensile strength in the transverse direction of between about 2700-2900 psi;

the vacuum film has an Elemendorf tear strength in the machine direction of between about 0.6-0.8 lb/mil;

the vacuum film has an Elemendorf tear strength in the transverse direction of between about 0.9-1.1 lb/mil;

the channels have a width of between about 11.2 mils (0.28 mm)±10%;

the channels have a depth of between about 6 mils (0.15 mm)±10%; and the channels are disposed apart from one another by a separation distance of between about 84.8 mils (2.15 mm)±10%.

2. The method of claim 1, wherein the resin is pre-impregnated into at least a portion of the composite laminate stack.

3. The method of claim 1, wherein heating comprises the application of infrared electromagnetic radiation at least through the vacuum film within a wavelength range between at least one of about 700 nm-1 mm, 2-10 μm, or 1.5-8 μm.

4. The method of claim 3, wherein heating occurs at a temperature of at least one of between about 110-130° F. (43.33-54.55° C.), between about 115-125° F. (46.11-51.67° C.), or about 120° F. (48.89° C.).

5. The method of claim 1, wherein the predetermined shape comprises at least one of an Ω-shaped or a Δ-shaped surface.

6. The method of claim 1, wherein the fabric laminate comprises carbon fibers.

7. The method of claim 1, wherein the pattern comprises at least one of a rectilinear grid pattern of the channels or a diamond pattern of the channels.

8. A method for forming a shaped composite structure, comprising:

laying a composite laminate stack onto a mold, wherein the composite laminate stack comprises fabric laminate and resin and wherein the mold presents a predetermined shape;

draping a vacuum film onto the composite laminate stack, thereby establishing an evacuatable volume between the vacuum film and the mold;

applying suction to the evacuatable volume between the mold and the vacuum film to establish at least a partial vacuum within the evacuatable volume, thereby compressing the composite laminate stack against the mold; and heating the composite laminate stack while applying suction to the evacuatable volume, thereby at least partially consolidating the laminate stack;

wherein:

the vacuum film resists deformation when exposed to infrared electromagnetic radiation having a wavelength within a range of about 700 nm-1 mm and a temperature range of between about 110-130° F. (43.33-54.55° C.);

one side of the vacuum film comprises a pattern of channels, permitting gases to be evacuated when the suction is applied to the evacuatable volume;

the vacuum film has a thickness of between 9.5 mils (0.24 mm)±10%;

the vacuum film is transparent to infrared electromagnetic radiation with a wavelength within a range of about 700 nm-1 mm;

the vacuum film has a tensile elongation in a machine direction of between about 500-550%;

the vacuum film has a tensile elongation in a transverse direction of between about 650-700%;

the vacuum film has a tensile strength in the machine direction of between about 3300-3500 psi;

the vacuum film has a tensile strength in the transverse direction of between about 2700-2900 psi;

the vacuum film has an Elemendorf tear strength in the machine direction of between about 0.6-0.8 lb/mil;

the vacuum film has an Elemendorf tear strength in the transverse direction of between about 0.9-1.1 lb/mil;

the channels have a width of between about 11.2 mils (0.28 mm)±10%;

the channels have a depth of between about 6 mils (0.15 mm)±10%; and the channels are disposed apart from one another by a separation distance of between about 84.8 mils (2.15 mm)±10%.

9. The method of claim 8, wherein the vacuum film comprises polyethylene.

10. The method of claim 8, wherein the pattern comprises at least one of a rectilinear grid pattern of the channels or a diamond pattern of the channels.

* * * * *